United States Patent [19]

Bulley

[11] Patent Number: 4,543,524
[45] Date of Patent: Sep. 24, 1985

[54] BIASED REACTOR MAINTENANCE TERMINATION UNIT

[75] Inventor: Raymond M. Bulley, Hanover Township, Morris County, N.J.

[73] Assignee: AT&T Bell Laboratories, Murray Hill, N.J.

[21] Appl. No.: 515,537

[22] Filed: Jul. 20, 1983

[51] Int. Cl.[4] .................... H04B 3/46; G01R 31/08
[52] U.S. Cl. ........................... 324/52; 179/175.3 R; 179/175.3 F
[58] Field of Search ........... 324/253, 254, 255, 117 R, 324/51, 52, 226; 179/175.3 R, 175.3 F

[56] References Cited

U.S. PATENT DOCUMENTS

| | | | |
|---|---|---|---|
| 3,660,620 | 5/1972 | Schimpf | 179/175.3 |
| 4,118,597 | 10/1978 | Proctor | 324/117 R X |
| 4,440,985 | 4/1984 | Federico et al. | 179/175.3 F |

*Primary Examiner*—Stanley T. Krawczewicz
*Assistant Examiner*—Jose M. Solis
*Attorney, Agent, or Firm*—Harry L. Newman

[57] ABSTRACT

A biased reactor maintenance termination unit (30) is described that comprises a saturable core reactor (31), a permanent magnet (90) and a termination network (16). The saturable core reactor (31) is connected in series with conductors (11, 13) of a transmission line. The permanent magnet (90) is placed adjacent to the reactor (31) to create a bias mmf. Finally, the termination network (16) is connected across the transmission line conductors (19,21).

10 Claims, 7 Drawing Figures

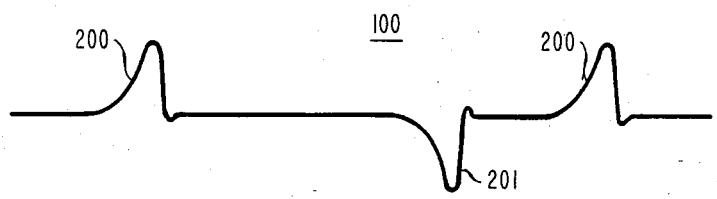
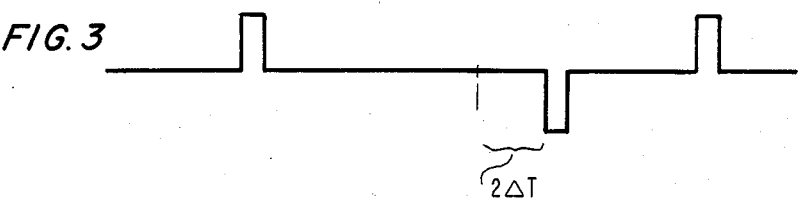
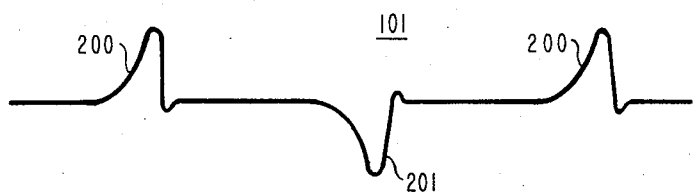
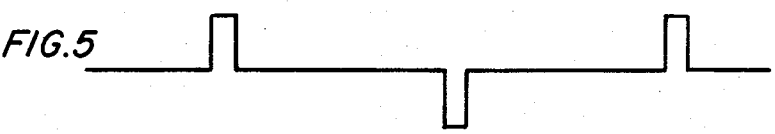

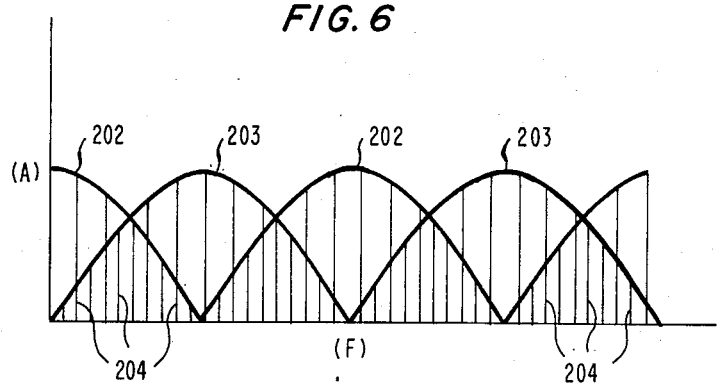
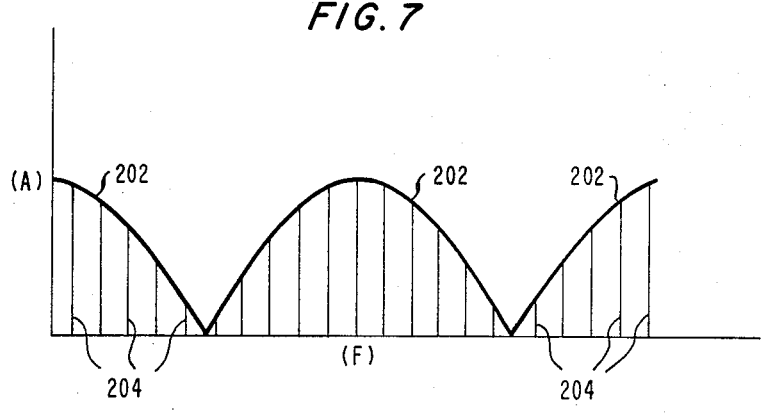

BIASED REACTOR MAINTENANCE TERMINATION UNIT

FIELD OF THE INVENTION

This invention relates to transmission line fault locating systems and in particular to a method and an apparatus for determining on which side of a maintenance termination unit the fault is located.

DESCRIPTION OF THE PRIOR ART

Providing apparatus for locating faults in a transmission line is becoming more and more important especially in the context of the telephone industry. In telephone loops, many customers provide their own terminal equipment and install their own wiring. A problem typically arises in determining whether there is a telephone service interrupting fault on the customer's side of a network-customer interface (NCI) or whether the fault has occurred on the network side, that is to say, on the telephone company's side of the NCI. Note that NCI refers simply to a junction point of the telephone company owned section of the loop or transmission line, and the customer owned section.

In addition, as can be the case, faults may occur on both sides, that is, a fault occurs on the customer's side and another fault occurs on the telephone company's side (network side) of the NCI. In that particular situation, it is important to determine which side of the NCI has a telephone service interrupting fault. Oftentimes, this is important because the telephone company or service may detect a fault on its side of the NCI, send a repair person out to service the fault and subsequently find out that the service interrupting fault was actually on the customer's side.

It is important, therefore, that not only the location of the fault be verifiable, but also that the magnitude of the faults located on each side be susceptible to calculation. These determinations will allow a telephone company or like utility to determine accurately and efficiently whether the actual service interrupting fault is on its side or on the customer's side.

Additionally, accurate fault location of this type would be particularly helpful to a telephone company. Oftentimes the type and severity of the fault dictates what type of craftsperson should be dispatched to repair it. Thus a fault location apparatus, such as that just described would help a telephone company more efficiently repair a fault.

Similar problems arise in transmission systems where it is desirable to locate a fault in one or the other section of the transmission line, e.g., aerial or underground sections, within or outside of buildings, diversely owned sections and so forth.

SUMMARY OF THE INVENTION

In accordance with an illustrative embodiment a biased reactor maintenance termination unit is disclosed. The unit comprises a saturable core reactor connected to a transmission line, a permanent magnet placed in close proximity to the reactor, and a recognizable termination connected across the transmission line on the customer's side of the reactor. The unit illustratively is connected in series with the pair of conductors of a transmission line directly at the NCI. This unit in conjunction with testing apparatus located at a remote location (a telephone company "maintenance center"), provides the information necessary to determine fault locations. The testing apparatus in this illustrative embodiment includes an ac generator and variable dc generator connected across the transmission line and a high pass filter connected to the line. The output of the high pass filter in turn is connected to a spectrum analyzer, and for illustrative purposes, to an oscilloscope.

The various parts of the testing apparatus are manipulated by a controller to determine fault location in the following manner. The controller may be a person who understands the sequence of operations, or it may be a computer and a program embodying the required sequence of operations.

The ac generator preferably sends a low frequency, sinusoidal ac signal (typically 60 Hz) along the transmission line to the maintenance termination unit. The unit in response to the ac signal generates a series of voltage spikes which are superimposed on the ac signal. The superimposed "spike" signal returns along the transmission line to the testing apparatus at the maintenance center. At the testing apparatus the signal is resistively coupled to a high pass filter, from which it passes to the spectrum analyzer. The spike signal may also be seen on an oscilloscope connected in parallel with the spectrum analyzer.

The positive and negative voltage spikes as seen on the oscilloscope are not equally spaced in time. This time-displacement is caused by a constant magnetomotive force, mmf, in the reactor core created by the permanent magnet. This constant mmf is referred to as the bias mmf. Thereafter, a variable dc test signal is applied to the transmission line to attempt to null out the bias mmf created by the permanent magnet. The value of direct current, flowing through the reactor windings, that exactly cancels the bias mmf is referred to as $i_{bias}$. Every maintenance termination unit in the fault locating system is calibrated during manufacture to have exactly the same bias mmf and hence the same $i_{bias}$ value.

If the bias mmf created by the permanent magnet cannot be canceled by the dc test signal, the fault is located before the maintenance termination unit or illustratively on the network or telephone company side of the unit.

If the dc test signal can be adjusted to cancel the bias mmf created by the permanent magnet, a fault has occurred beyond the maintenance termination unit, that is, in this embodiment, on the customer side of the unit. There may be a simultaneous fault on the network side, however. Therefore, the dc test signal value is measured by utilizing conventional techniques. In one illustrative embodiment if, at the null condition, the value of the dc test signal is equal to $i_{bias}$, then there is a fault on the customer side of the termination unit only. If the dc test signal value is greater than $i_{bias}$, then there is a fault on both sides of the maintenance termination unit.

In this illustrative embodiment, the oscilloscope or the spectrum analyzer along with the value of the variable dc test signal can be utilized in conjunction with the maintenance termination unit to respectively, (1) determine on which side of the maintenance termination unit the fault occurs and (2) determine the value of the resistive fault on each side of the maintenance termination unit. The spectrum analyzer can be used advantageously in this embodiment to indicate more precisely the point at which a null condition occurs.

BRIEF DESCRIPTION OF THE DRAWINGS

FIG. 2 shows a voltage spike signal created by the maintenance termination unit;

FIG. 3 shows a rectangular pulse approximation of the signal of FIG. 2;

FIG. 4 shows the voltage spike signal at the null condition;

FIG. 5 shows a rectangular pulse approximation of FIG. 4;

FIG. 6 shows a Fourier transformation of the signal of FIG. 3; and

FIG. 7 shows a Fourier transformation of the signal of FIG. 5.

DETAILED DESCRIPTION

Figure 1:
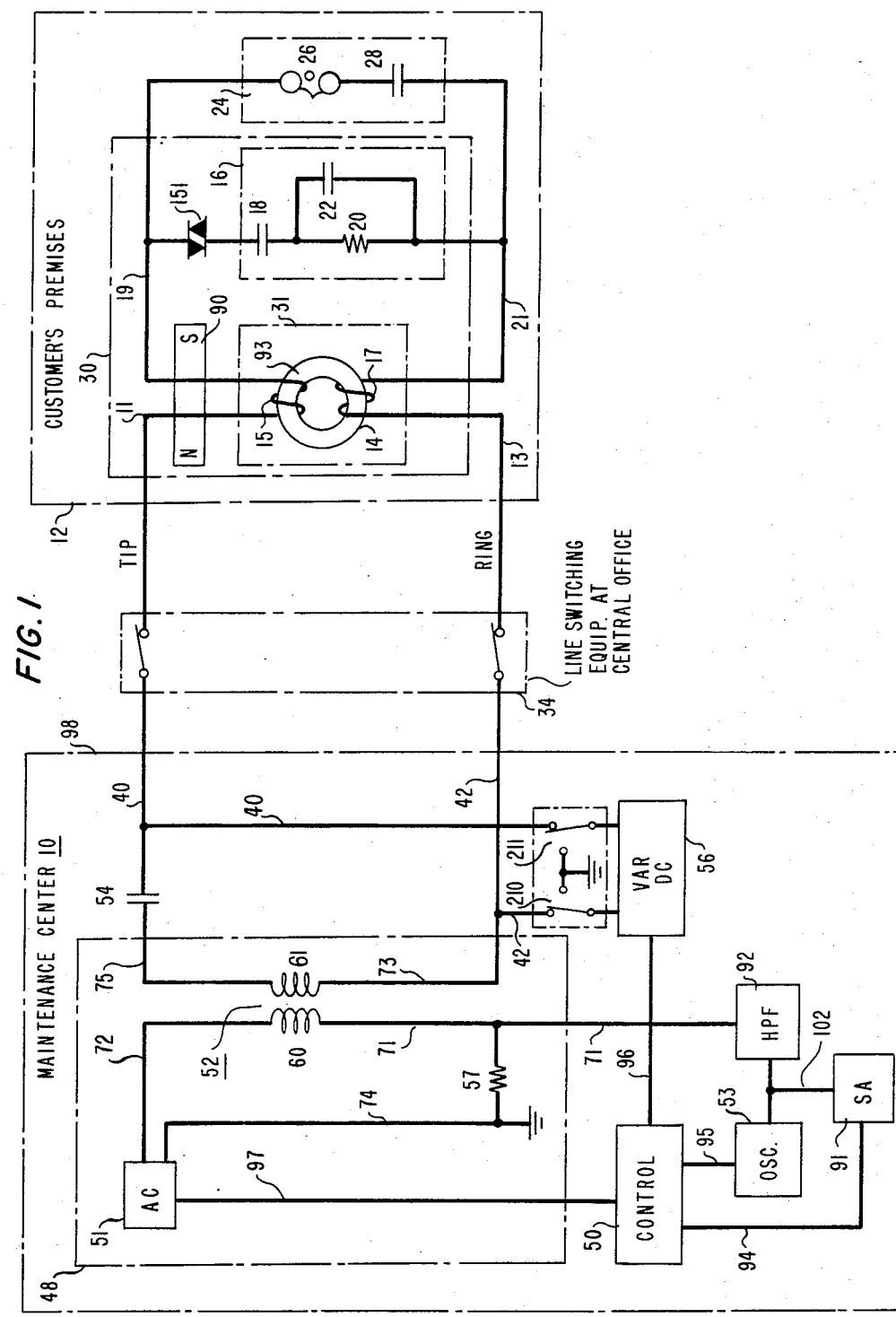
FIG. 1 is a transmission line with a biased reactor maintenance termination unit and testing apparatus connected thereto.

Referring to FIG. 1, the telephone loop 11, 13 is shown connecting a telephone company maintenance center 10 with a customer's premises 12 having inside wiring. At the customer's premises 12, there is shown a biased reactor maintenance termination unit (MTU) 30 that includes a saturable core reactor 31. The core reactor 31 further comprises a core 14 and two reactor windings 15, 17. The reactor windings 15, 17 are, in turn, connected with the subscriber loop conductors 11, 13 respectively. Also shown connected to the reactor windings 15, 17 are loop conductors, 19, 21 respectively, of the inside wiring.

Located in close proximity to the saturable core reactor 31 as part of unit 30 is permanent magnet 90. The core 14 is preferably a tape wound core and the dielectric coating of the tape creates a spiral gap 93 within the core. The permanent magnet 90 together with the spiral gap 93 in the core 14 creates a bias mmf in the core 14. The permanent magnet 90 applies a radially directed magnetic field to the core 14. The spiral gap 93 in the core 14 converts part of the radial field into a circumferential bias mmf. The bias mmf is similar to that which could be produced by an additional winding carrying direct current of value $i_{bias}$. Connected across the conductors 19, 21 is a termination network 16 which is also part of the MTU 30 comprising in series a varistor 151, a capacitor 18 and a resistor 20 and a capacitor 22 connected in parallel across the resistor 20.

Terminal equipment such as a telephone set 24 usually includes a ringer 26 and a capacitor 28 that is permanently connected across the conductors 19 and 21.

The preferred location of the MTU 30 is at the entrance of loop 11, 13 to the customer's premises 12, usually adjacent and on the customer's side of the protector block (not shown).

Thus it can be seen that the reactor winding 15 connected at one end with conductor 11 and at the other end with conductor 19 provide continuous and permanent connection between the line switching equipment at the central office 34 and the telephone set 24. Likewise, conductor 13, reactor winding 17, and conductor 21 provide a continuous and permanent connection between the switching equipment 34 and telephone set 24. The conductors 11, 15, 19 and 13, 17, 21, are sometimes referred to as the tip and ring conductors respectively.

During normal telephone operation, usually a minimum loop current of about 20 milliamps flows through the telephone subscriber loop 11, 13. Such a loop current will saturate core 14, making the reactor 31 essentially transparent to superimposed signals such as voice signals. Thus, under normal operations, reactor 14 and termination network 16 will not affect telecommunications.

Alternating current (ac) generator 48, which is part of the apparatus 98, comprises an ac source 51 and a transformer 52, in which one end of primary winding 60 is connected to the source 51 via lead 72. The other end of the primary winding 60 is connected to one end of resistor 57 via lead 71. The other lead of the resistor 57 in turn is connected to the ac source 51 and ground via lead 74.

The apparatus 98 also includes a high pass filter 92 which at its input is connected one end of resistor 57 via lead 71. The output of filter 92 is in turn connected to spectrum analyzer 91 and oscilloscope 53 via lead 102. The high pass filter 92 prevents the low frequency (60 Hz) of the ac signal from overloading the spectrum analyzer 91 and oscilloscope 53. The secondary winding 61 of transformer 52 is connected at one end to ring conductors 42 and 13 via lead 73. Capacitor 54 is connected to transformer 52 at the other end of the secondary winding 61 via lead 75. The other end of capacitor 54 is connected to tip conductors 40 and 11. The purpose of capacitor 54 is to prevent direct current from the dc generator 56 from flowing through transformer winding 61.

Variable direct current generator 56 is connected as shown to the tip and ring conductors 11 and 13 via leads 40 and 42, respectively. The variable dc generator 56 may also be connected between tip and ground or ring and ground by operation of switches 210 or 211, respectively. Controller 50 manipulates the operation of spectrum analyzer 91, oscilloscope 53, variable dc generator 56 and ac source 51 via leads 94, 95, 96 and 97, respectively.

When the subscriber loop is reported to be faulty it becomes necessary to determine whether the fault is located on the customer's side or the network side of the MTU 30. It is also important to determine whether there is a fault on both sides of the MTU 30. Once a determination is made as to where the fault is located, an appropriate repair person is assigned to correct the fault. Alternatively, if the subscriber owns the section of the subscriber loop beyond MTU 30, the aforesaid fault locating fixes the responsibility for correcting the fault.

By using the following testing procedure the location of a fault can be determined.

Accordingly, when a fault is reported, line switching equipment 34 is operated to connect the testing apparatus 98 to the loop under test (conductors 11 and 13). Controller 50, thereafter, signals alternating current source 51, to apply an ac test signal between tip and ring conductors 11 and 13. The ac test signal flows through the reactor winding via transformer 52, and the telephone loop 11, 13 thereby causing the magnetic flux induced in the core 14 to be switched periodically.

The switching of the magnetic flux induces a voltage in the reactor windings 15 and 17 which appears as a series of spikes superimposed on the ac test signal. The termination network 16, and, if present, the ringer 24 complete the-current path for both the ac test signal and the spike signal. In particular, the capacitor 22 is present to complete the path for the spike signal. As a consequence, the spike signal can travel along the loop 11 and 13 back to the testing apparatus 98. The resistor 57 serves to couple the spike signal and also the ac test signal to the high pass filter 92. The presence of the bias mmf created by permanent magnet 90 causes the spikes to be unequally spaced as shown in FIG. 2. However, if a direct current of value $i_{bias}$ and appropriate sign is made to flow through winding 15, through a resistive fault between conductors 19 and 21 and return through winding 17, then this current will cancel the bias mmf and the spikes will become equally spaced as shown in FIG. 4.

The spike signal returns along the loop and is coupled to the high pass filter 92 via resistor 57 and lead 71. The high pass filter 92 blocks the low frequency portion of the signal returning along the loop and sends the remainder of the signal to oscilloscope 53. Oscilloscope 53 displays this signal as seen in FIG. 2, showing the unequal spacing of the positive and negative voltage spikes 200 and 201.

In this embodiment, the variable dc generator 56 produces a dc test signal which is utilized to cancel or null the bias mmf of the core 14. The null condition will have been attained when the positive and negative voltage spikes 200 and 201 are equally spaced from each other as shown in FIG. 4.

Controller 50 signals the variable dc generator 56 to attempt to cancel the bias mmf created by the permanent magnet. If after the variable dc generator 56 is adjusted to its maximum current, there is still no change in the time relationship of the positive and negative voltage spikes 200 and 201, then no dc generator current is flowing through the MTU 30 and hence the fault is on the network side of the MTU 30. Thereafter the telephone company or like utility can dispatch the appropriate repair personnel.

If, however, the null condition is attained and the current produced by the variable dc generator 56 is equal to the $i_{bias}$ value then there is a single resistive fault on the customer's side of the maintenance termination unit and its value can be determined by equation (1), $$R_c = V_{dc}/i_{bias} \quad (1)$$

where $R_c$ is the sum of the loop resistance and the value of the resistive fault on the customer's side of the termination unit, $V_{dc}$ is the value of the dc voltage between conductors 40 and 42 when the null condition occurs, and $i_{bias}$ is the value of direct current needed to cancel the bias mmf produced by the permanent magnet.

If the dc voltage is measured, the value of the resistive fault on the subscriber premises can be easily determined utilizing the above-mentioned equation because the $i_{bias}$ value is a known constant for the system.

If, on the other hand, the null condition occurs and the current produced by the variable dc generator 56 is greater than the $i_{bias}$ value, then there are both network and customer faults. The values of the respective faults can be determined by using equation (1) in combination with the following equation (2).

$$R_n = \frac{V_{dc}}{i_{dc} - i_{bias}} \quad (2)$$

Where, $R_n$ is the resistive fault on the network side of the termination unit 30 and $i_{dc}$ is the magnitude of the current supplied by the dc generator 56 required to produce the null condition. ($R_n$ will, in fact, include some portion of the loop resistance.) As demonstrated by equations (1) and (2) the magnitudes of the resistive faults ($R_c$ and $R_n$) can also be readily determined by the before described apparatus.

All of the foregoing applies to resistive faults between the tip and ring conductors 11 and 13 (FIG. 1). The test apparatus can equally well determine the location of resistive faults between either tip 11, and ground or ring 13 and ground. This is achieved by repeating the foregoing procedure with either switch 210 operated (for tip to ground faults) or switch 211 operated (for ring to ground faults). For these two cases, it should be noted that the direct current will be flowing in only one winding of the reactor 15 or 17 and consequently its value at the null condition is $2i_{bias}$. In all other respects the fault locating procedure is identical to that used in the tip to ring case.

As before mentioned, the null condition is found by varying the dc generator until the positive and negative voltage spikes 200 and 201 become equidistant from each other as shown in FIG. 4. As a further refinement of this invention, a spectrum analyzer 91 is utilized to more precisely indicate the null condition.

It is understood that in determining the null condition it is sometimes difficult to visually ascertain (using an oscilloscope) whether or not the superimposed voltage spikes 200 and 201 (FIG. 2) created by the switching of the core 14 (FIG. 1) are located equal distances from each other. A spectrum analyzer 91 is used advantageously in this embodiment to Fourier transform the superimposed spike signal received from the MTU 30 (FIG. 1) and therefore more accurately ascertain the null condition.

It is known that a spectrum of the signal of FIG. 3 (a square wave approximation of FIG. 2) can be obtained which has the following form $$A_n = \frac{2\sqrt{2\tau}}{T} \sqrt{1 - \cos n\pi \cos 4n\pi \frac{\Delta t}{T}} \quad (3)$$

Where $A_n$ is the amplitude of the component of frequency $n/T$, $\tau$ is the pulse width, $2\Delta t$ is the time displacement of the voltage spikes, as shown in FIG. 3, n is the sequence number of the spectral line and T is the period of the wave form (this is, of course, the same as the period of the ac test signal.) The set of all spectral lines $\{A_n\}$ can be viewed as two interleaved spectra: one consisting of odd harmonics and the other of even harmonics. For the odd harmonic case equation (3) reduces to $$A_n = \frac{4\tau}{T} \cos 2n\pi \frac{\Delta t}{T} \text{ (n-odd)} \quad (4)$$

and for the even harmonic case the equation (3) reduces to $$A_n = \frac{4\tau}{T} \sin 2n\pi \frac{\Delta t}{T} \text{ (n-even).} \quad (5)$$

From equations 4 and 5 it can be mathematically demonstrated that if $2\Delta t$ (the time displacement between the positive and negative voltage spikes, as shown in FIGS. 2 and 3,) is equal to zero, (i.e., the null condition exists) then the even harmonic spectrum vanishes and the odd harmonic spectrum consists of components of equal amplitude as illustrated by equations (6) and (7).

$$A_n = \frac{4\tau}{T} \text{ (odd harmonics)} \quad (6)$$

$$A_n = 0 \text{ (even harmonics)} \quad (7)$$

Thus, it is apparent that if the bias mmf created by the permanent magnet is canceled, then only the odd harmonic signal remains.

FIG. 6 of this embodiment is the spectrum of the signal of FIG. 3 showing the interleaved odd and even harmonic envelopes 202 and 203, respectively. Associated with each envelope 202 and 203 are spectral lines 204 which contain the energy of the signal at its harmonic frequencies (F).

FIG. 7 of this embodiment is the spectrum of the signal of FIG. 5 (a rectangular pulse approximation of FIG. 3). As before noted, only the odd harmonic envelope remains when the bias mmf is canceled. Thus, when the bias mmf is nulled by adjusting the variable dc generator 56 (FIG. 1), voltage spikes 200 and 201 are evenly spaced as shown in FIG. 4, and the odd harmonics 202 as seen on the spectrum analyzer 91 (FIG. 1) are eliminated.

Thus, by observation with the spectrum analyzer 91 (FIG. 1) and varying the dc generator 56 (FIG. 1) the null condition can be readily ascertained. A spectrum analyzer is utilized in this illustrative embodiment to more easily visualize the null condition. It is well recognized by those skilled in the art, however, that if a very restricted set of frequencies are utilized by an instrumentation system, then the spectrum analyzer could be replaced by a much simpler form of digital signal processor.

This invention makes it possible to determine the value and location of service interrupting faults in a transmission line. These determinations make it easier for the telephone company or other utility to determine whether to send appropriate personnel out to repair the fault or whether the repairs should be the responsibility of the customer.

In all cases, it is to be understood that the above-described embodiment is illustrative of one of many possible specific embodiments which represents applications of the principles of my invention. Thus numerous and various other embodiments can be devised readily in accordance with these principles by those skilled in the art without departing from the spirit and scope of my invention.

What is claimed is:

1. An apparatus for locating faults in a transmission line comprising:
   a saturable core reactor adapted to be connected in series with the transmission line,
   the reactor further comprising a core with a plurality of windings,
   a permanent magnet located adjacent to the reactor for creating a magnetomotive bias in the core,
   means for generating an ac signal that will switch the reactor alternately between its two states,
   means for supplying a dc signal to the reactor so that the magnetomotive bias can be canceled, and
   means for detecting the cancellation of the magnetomotive bias.

2. The apparatus of claim 1 in which the generating means is a sinusoidal alternating current generator.

3. The apparatus of claim 1 in which the detecting means is an oscilloscope.

4. The apparatus of claim 1 in which the supplying means is a variable direct current generator.

5. The apparatus of claim 1 in which the detecting means is a spectrum analyzer.

6. A method for locating faults in a transmission line including;
   a fault locating apparatus comprising a testing apparatus and a maintenance termination unit for determining whether a fault is on one side or the other of the unit or on both sides of the unit, the method comprising the steps of:
   transmitting an ac signal along the transmission line from the testing apparatus to the maintenance termination unit, causing the unit to switch and send a spike signal back along the line,
   detecting even and odd harmonics of the spike signal,
   nulling the even harmonics of the superimposed spike signal with a variable dc test signal transmitted from the testing apparatus, when the null condition is attained, the current flowing through the unit is of value $i_{bias}$,
   measuring the value of the variable dc test signal at the testing apparatus, and
   comparing the dc test signal value that produces the null condition to the known $i_{bias}$ value of the unit to determine whether the fault is on one side or the other of the unit or on both sides of the unit.

7. The method of claim 6 in which the comparing step further comprises,
   determining if the value of the test signal is greater than or equal to the $i_{bias}$ value flowing in the unit at the null condition,
   a fault being located on the one side of the unit if the dc test signal value is equal to the $i_{bias}$ value, and
   a fault being located on both sides of the unit if the dc test signal value is greater than the $i_{bias}$ value.

8. A maintenance termination unit for locating faults in a transmission line as being on one side of the unit or the other or on both sides,
   the unit responding to an ac test signal by generating a spike signal in which each negative going spike is unequally spaced between its neighboring positive going spikes, the unequal spacing being caused by a bias mmf,
   the unit responding to a dc test signal which cancels the bias mmf and thereby eliminates the unequal spacing of the positive and negative going spikes in the spike signal if there is a fault on the other side of the unit or on both sides,
   the unit comprising;
   a saturable core reactor adapted to be connected in series with the transmission line for generating the spikes in response to the ac signal, and
   a permanent magnet placed in close proximity to the core reactor for creating the bias mmf in the unit.

9. A maintenance termination unit for detecting faults in a transmission line as being on one side or the other or on both sides, the unit comprising;
   a saturable core reactor adapted to be connected in series with the transmission line for generating spikes in response to an ac signal,
   a permanent magnet placed adjacent to the reactor for creating a bias mmf in the reactor,
   the unit responding to an ac test signal by generating spikes that are time displaced by the bias mmf produced by the permanent magnet, the unit also responding to a dc signal to cancel the bias mmf in the core and to thereby eliminate the time displacement in the spike signal when there is a fault on the other side of the unit or on both sides.

10. Fault detection apparatus adapted to be connected in a transmission line between a testing location and a remote location, the transmission line including a pair of conductors and the apparatus comprising:
   a saturable core reactor;
   a first winding disposed about the reactor adapted for connection in series with a first of the two conductors of the transmission line;
   a second winding disposed about the reactor adapted for connection in series with the second conductor of the transmission line;
   a permanent magnet positioned adjacent to the reactor for applying a constant mmf to the core, the mmf produced by the permanent magnet imparting a bias to the magnetomotive force in the reactor core; and
   a termination circuit adapted for connection between the first and second conductors on the remote location side of the first and second windings, the saturable core reactor, permanent magnet and termination circuit in combination providing a basis for determining whether there is a resistive fault in the transmission line and if a fault is present whether it is on the testing location side, the remote location side, or both sides of the fault detection apparatus, the determination being made at the test location by the application of an ac signal and a dc signal to the transmission line, the canceling of the bias in the reactor core by the application of a dc signal that is equal to an $i_{bias}$ value indicating that a fault is on the remote location side of the fault detection apparatus, the canceling of the bias by the application of a dc signal that is greater than the $i_{bias}$ value indicating that a fault exists on both sides of the fault detection apparatus, and the inability to cancel the bias by the application of a dc signal greater than the $i_{bias}$ value indicating that a fault exists on the testing side of the fault detection apparatus.

* * * * *